Sept. 20, 1927.  G. ZEBRAT  1,642,865
COFFEE PERCOLATOR
Filed April 9, 1927
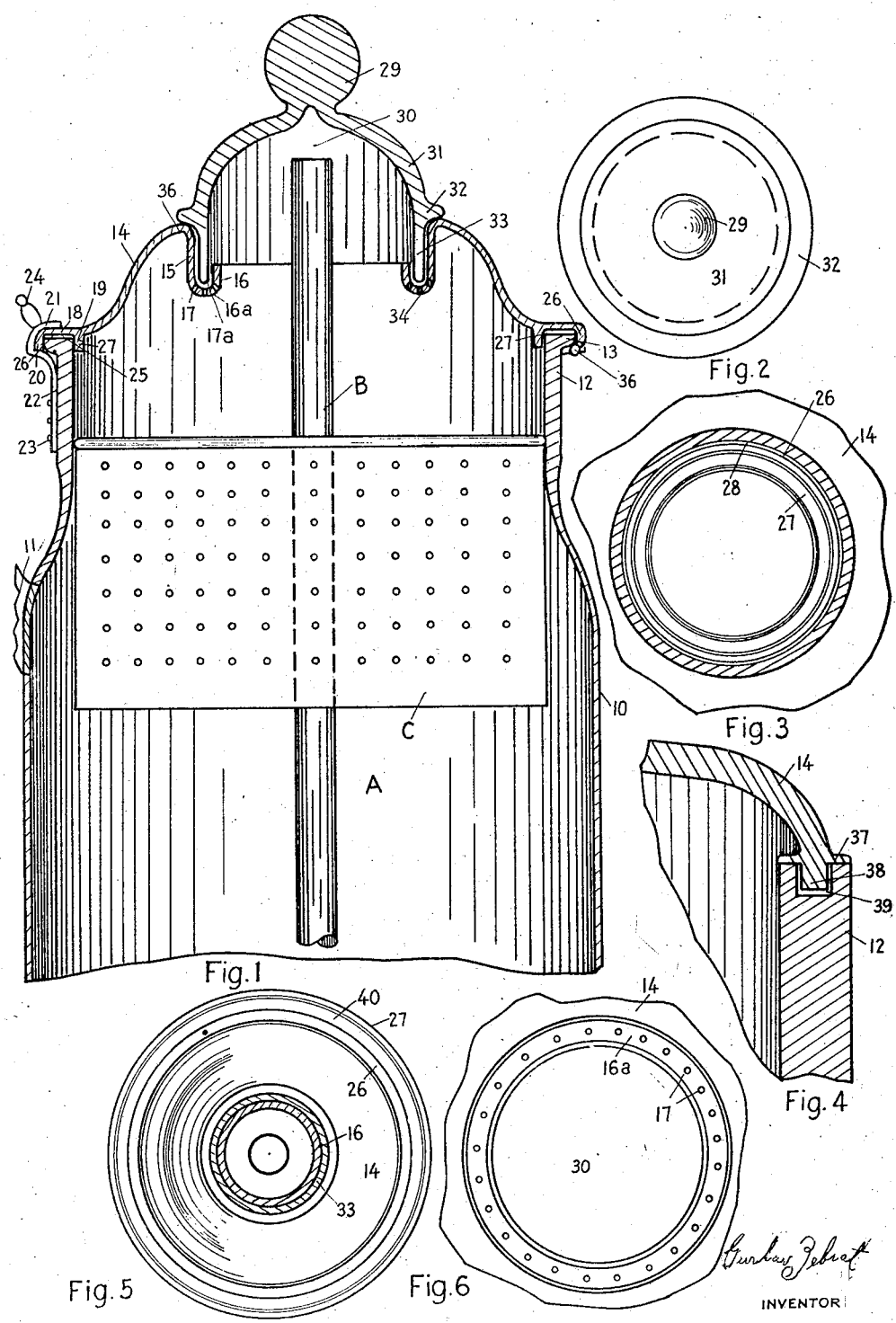

Patented Sept. 20, 1927.

1,642,865

UNITED STATES PATENT OFFICE.

GUSTAV ZEBRAT, OF SOUTH PASADENA, CALIFORNIA.

COFFEE PERCOLATOR.

Application filed April 9, 1927. Serial No. 182,397.

This invention relates to improvement in cooking utensils and more particularly to coffee percolators, and has for its object to provide a simple, efficient and inexpensive device of this character.

One of the objects of my invention is to provide a coffee percolator with improved means for rendering the same seal tight in order to avoid leakage, seepage and escape of boiled coffee siphoned up in the course of boiling the coffee therein.

Another object of my invention is to provide an improved coffee percolator with means for efficiently seating the lid down tight upon the coffee vessel proper, and in a manner to assure a coffee seal being created, to keep the coffee against escaping around the lid, or between lid and the upper edge of the vessel covered by the lid.

A still further object of my invention is to provide an improved coffee percolator so designed and constructed that it can be manufactured at no greater expense than conventional coffee percolators, and that will be proof against boiling, sizzling coffee finding exit around the top of the percolator, or to overflow and stream down against the sides of the vessel.

Another object of my invention is to provide a coffee percolator so shaped and designed that both the lid and the cap mounted upon the lid, in conventional practice, is arranged to seat with a tight fit upon their mountings, provision being had for diverting the boiled coffee siphoned up into the upper chamber of the percolator from any tendency to stream outside the vessel to make it drip back or empty back into the vessel interiorly.

In carrying out the purposes of my invention I provide the lid with a marginal channel-shaped rim designed to snugly seat upon the upper edge of the vessel, and interpose a gasket between this edge and said marginal rim for the purpose of restraining the coffee from finding a direct exit between the mentioned edge and the lid of the percolator.

A still further object of my invention is to provide a coffee percolator whose lid is equipped with a removable cap so shaped and constructed that when seated upon the lid it will be embraced by a rim effective to provide a coffee tight seal between the lid and the coffee vessel proper.

With the above and other objects in view my invention consists in the combination, arrangement and details of construction disclosed in the drawings and specifications and then more particularly pointed out in the appended claims.

In the drawings, which are merely illustrative of my invention and in which similar reference characters designate similar parts thruout the respective views, Figure 1 is a fragmentary vertical sectional elevation of a coffee percolator embodying my invention, Figure 2 is a plan view of the cap seated upon the lid of the percolator, Figure 3 is a fragmental sectional cross sectional view taken thru the lid of the percolator showing the channel shaped rim of the lid, Figure 4 is a fragmental sectional detail view of the percolator and lid showing a modified closure for the coffee vessel, Figure 5 is another cross sectional view taken thru the vessel and Figure 6 is a bottom plan view of the lid, shown fragmentarily.

Referring to the drawings, 10 designates a coffee percolator provided with the usual spout (shown partially) 11, the upper edge of this vessel being thickened as at 12 and terminating in a marginal lip or bead 13. The conventional appliances which come equipped with the utensil such as the strainer C located in the main chamber A of the vessel, and the siphon tube B, form no parts of the present invention but are standard equipment.

The vessel 10 is designed to be covered, as at present, by means of a lid or cover, 14 which is formed conical in configuration or concavo-convex in shape. This lid is formed centrally with an integral, depending downwardly-depressed tubular neck providing an opening into the interior of the vessel.

The tubular neck 15 is rolled around at its lower end so as to provide an annular U-shaped groove, channel or trough; the bend forming the groove is designated 16ª and the groove itself is designated 17ª, while formed in a plane with the groove and providing one wall thereof is an annular wall 16; the arrangement is such that 16 forms a collar disposed concentrically within the tubular neck 16 and joined to it by means of the portion 16ª; formed upon the annular portion or bottom 16ª of the trough are a series of perforation or coffee exit ports 17.

The lid 14 is provided with a marginal channel-shaped rim formed by the parallel annular flanges 26 and 27 providing an annular groove 40 therebetween; the inner edge of the flange 26, which edge is designated 28 is designed to abut the annular rib or bead 13 of the percolator vessel, both flanges 26, 27 straddling the upper edge of the vessel snugly; if desired a suitable packing, washer or gasket of soft flexible or harder material may be employed and interposed so as to lie upon the upper edge of the vessel and upon the bead 13, and to be surmounted by means of the marginal channeled shaped rim of the lid 14. 36 designates the hinge for mounting the lid upon the vessel. A resilient member such as the spring catch 21 is designed to hook over the rim of the lid, and to hold the lid against displacement from the vessel, and also to press the lid down firm upon the vessel edge mentioned. This catch has its main body portion 22 secured by fasteners 23 to the side of the vessel, 12. A handle 24 is provided by means of which the catch may readily be disengaged from the lid to allow the lid to be raised.

The lid 14 carries the conventional cap 31 which is a hollow cylindrical body carrying the handle ball 29 and having the interior chamber 30 in which coffee may enter when boiled. This cap is provided between its ends with an annular bead or flange 32; the cap is hinged by the hinge knuckles 35 upon the lid in a manner to permit of the cap, when seated, to project with its lower portion 33 into the tubular neck 15 of the lid, and also to project snugly but partially into the trough or groove of the neck 15, so that its lowest edge is spaced slightly above the bottom of said groove. In this way it is provided that the cap shall allow the ports 17 of the trough to be uncovered at all times. The flange 32 of the cap 31 seats and rests upon the upper end of the lid 14; and the cap is supported by this lid in the manner specified above, with its bottom edge disposed slightly above the coffee exit ports 17.

From the above it will readily be seen that when the coffee has boiled in the vessel 10, and begins to be siphoned upwardly of the tube B, the coffee in a very hot condition would usually make an effort to escape thru the usual crevices afforded by the coffee percolators now in existence; but the coffee cannot escape between the bead 13 of the vessel and the lid 14 due to the channeled rim of the lid, and to the packing or gasket 25. And the coffee cannot pass around from between the cap and the lid and out of the vessel so as to stream down the sides thereof. This is because of the fact that the coffee should it overflow or reach the cap and succeed in finding its way into the trough, cannot overflow this trough for as fast as it enters the trough it will leave thru the ports or exit holes 17 and thus find its way back to the interior of the vessel 10.

From the foregoing it will be seen that I have provided a simple and inexpensive device for guarding against the escape of hot coffee from the interior to the exterior of the vessel 10. I claim all variations, changes and modifications falling within the purview of the appended claims.

What I desire to claim and seek protection on is as follows:—

1. A coffee percolator consisting of a vessel, a lid hingedly carried by said vessel, a cap movably mounted upon said lid, a trough in which said cap is seated, and means whereby said lid engages said vessel with a fluid tight action.

2. A coffee percolator consisting of a vessel, a lid hingedly carried by said vessel, a cap removably mounted upon said lid, means embracing said cap at the point where it seats upon the lid to provide a fluid tight seal, and means interengaging the vessel top edge and the lid for establishing a fluid tight connection at this point.

3. A coffee percolator consisting of a vessel having a thick upper edge, a conical lid hingedly associated with said vessel, said lid and the upper edge of said vessel having an annular tongue and groove arrangement, a gasket in the groove of said arrangement assisting to creating a coffee seal between lid and vessel, a cylindrical cap seated in said lid removably, an annular trough carried by said lid having perforations, and means for supporting said cap upon said lid in a manner to dispose said lid in said trough but in spaced relation with respect to said perforations.

4. A coffee percolator consisting of a coffee vessel, a lid thereon having an annular rim engaging the edge of said vessel in a manner to create a coffee tight seal therewith, a depending annular trough formed centrally upon said lid, a cylindrical cap projecting into said trough, and means for seating said cap upon said lid at a point above said trough.

5. A coffee percolator consisting of a coffee vessel, a lid thereon, an annular rim formed upon said lid and providing a channel into which the vessel top edge snugly projects, a washer overlying said vessel edge and being surmounted by said lid rim, resilient means pressing said lid upon the vessel edge, a depressed sunken-in annular trough formed centrally upon said lid, and a cap removably disposed in said trough and spaced above the bottom thereof, said trough having exit ports disposed in a plane below said cap.

6. A coffee percolator consisting of a coffee vessel, a lid thereon closing said vessel, an annular lip formed upon the upper edge of said vessel, an annular channeled-out rim formed upon the lid a gasket interposed between said channeled-out rim and said lip, a catch closing said lid tightly against said lip, a removable cap seated centrally in said lid, and means on said lid embracing the under edge of said cap and having perforations for the escape of coffee.

7. In a device as described, the combination of a vessel, a concavo-convex lid hingedly mounted upon said vessel, a tubular-shaped body dependingly formed concentrically of said lid, a cap projecting into said tubular body, a flange on said cap resting upon said tubular body with its lower edge spaced above the lower end of said body, and means on said tubular body at its lower end and embracing said cap for receiving the overflow of coffee in said cap.

8. In a coffee percolator, the combination of a vessel, a conical shaped lid mounted thereupon, a depending cylindrical neck formed concentrically of said vessel, an annular ledge formed at the lower end of said neck and providing an annular groove therein having exit ports for coffee, and a cap seated on top of said lid and having its main body portion projecting partially into said groove.

9. In a coffee percolator, the combination of a vessel, a conical shaped lid mounted thereupon, a cylindrical depending neck formed centrally upon said lid, an annular body projecting parallel with said neck into the latter and forming with the neck an annular trough, said trough being formed with exit ports for coffee, a cylindrical cap having a flange seated upon the top whereby to space the under edge of said cap above the lower surface of the trough, said cap projecting into said trough.

In witness whereof he has hereunder set his hand this ninth day of March, 1927.

GUSTAV ZEBRAT.